United States Patent
Liu (10) Patent No.: US 9,368,985 B2
(45) Date of Patent: Jun. 14, 2016

(54) ELECTRICAL SYSTEM, INPUT APPARATUS AND CHARGING METHOD FOR INPUT APPARATUS

(71) Applicant: HTC Corporation, Taoyuan County (TW)

(72) Inventor: Hsin-Chih Liu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 335 days.

(21) Appl. No.: 13/775,260

(22) Filed: Feb. 25, 2013

(65) Prior Publication Data

US 2014/0239880 A1  Aug. 28, 2014

(51) Int. Cl.
*H02J 7/00* (2006.01)
*H02J 17/00* (2006.01)
*H04B 5/00* (2006.01)

(52) U.S. Cl.
CPC .............. *H02J 7/0042* (2013.01); *H02J 17/00* (2013.01); *H04B 5/0037* (2013.01)

(58) Field of Classification Search
USPC ........................................................ 320/114
See application file for complete search history.

(56) References Cited

U.S. PATENT DOCUMENTS

| 5,973,677 A * | 10/1999 | Gibbons ................ 345/179 |
| 2006/0028458 A1* | 2/2006 | King et al. .............. 345/179 |
| 2009/0022332 A1 | 1/2009 | Van Schaack et al. |

FOREIGN PATENT DOCUMENTS

| TW | 200828078 | 7/2008 |
| TW | 201027397 | 7/2010 |
| TW | M426814 | 4/2012 |

OTHER PUBLICATIONS

"Office Action of Taiwan Counterpart Application", issued on Mar. 31, 2015, p. 1-p. 11, in which the listed references were cited.
"Office Action of Germany Counterpart Application", issued on Dec. 17, 2014, p. 1-p. 7, in which the listed reference was cited.

* cited by examiner

Primary Examiner — Eric Lee
(74) Attorney, Agent, or Firm — Jianq Chyun IP Office (57) ABSTRACT

An electrical system, an input apparatus and a charging method for the input apparatus are provided. The input apparatus includes a main body, a processor, an antenna module, an energy storing component and an electrode. The main body includes a stylus body and a stylus head. The processor, antenna module and the energy storing component are disposed in the main body. The energy storing component is used to provide electrical energy to the processor and the antenna module. The electrode is disposed on a surface of the main body, and the electrode is coupled to the energy storing component. Wherein, when the stylus input apparatus contacts with the electronic apparatus, the electronic apparatus provides an electrical energy to the energy storing component through the electrode.

19 Claims, 6 Drawing Sheets

ELECTRICAL SYSTEM, INPUT APPARATUS AND CHARGING METHOD FOR INPUT APPARATUS

BACKGROUND

1. Field of the Invention

The present invention is directed to an input apparatus and more particularly, to an input apparatus of an electrical system and a method of charging the same.

2. Description of Related Art

With the improvement of the technology, handheld electronic apparatuses have become essential tools in people's life. Taking a tablet computer for example, a touch screen is used as a basic input apparatus and provides the same level functionality as a conventional computer. Moreover, with a feature of portability, the tablet computer has become one of the mainstreams among consumer electronic products.

In a tablet computer, a stylus pen is provided and used as a medium for operating the touch screen of the tablet computer. The stylus pen communicates with the tablet computer by actively sending wireless signals to the touch screen to perform operations of a user on the tablet computer. In a conventional tablet computer, the stylus has to be charged by using an additional charger. Namely, when the power of the stylus is ran out, and the user does not bring the charger with him/her, or the user can not charge the stylus due to an environment where he/she is located, the user will be unable to operate the tablet computer by using the stylus. As a result, the convenience of the tablet computer is dramatically reduced.

SUMMARY

The present invention provides an input apparatus and a method of charging the input apparatus, by which the input apparatus is charged through an electronic apparatus.

The present invention further provides an electrical system, of which an input apparatus is charged through a host.

The input apparatus provided by the present invention includes a main body, a processor, an antenna module, an energy storing component and an electrode. The main body includes a stylus body and a stylus head. The processor is disposed in the main body. The antenna module is coupled with the processor and disposed in the main body. The energy storing component is disposed in the main body, coupled to the processor and the antenna module and configured to provide electrical energy to the processor and the antenna module. The electrode is disposed on a surface of the main body and coupled with the energy storing component. When the input apparatus is in an electronic apparatus, the electronic apparatus contacts the electrode and charges the energy storing component through the electrode.

The present invention still further provides an electrical system including an input apparatus and an electronic apparatus. The input apparatus includes a main body, a first processor, an antenna module, a first energy storing component and a first electrode. The main body includes a stylus body and a stylus head. The first processor is disposed in the main body. The antenna module is disposed in main body and coupled with the processor. The first energy storing component is disposed in the main body, coupled to the first processor and the antenna module and configured to provide electrical energy to the first processor and the antenna module. The first electrode is disposed on a first surface of the main body and coupled with the energy storing component. The electronic apparatus has a slot to contain the input apparatus. The electronic apparatus includes a second processor, a second energy storing component, a second electrode and a sensor. The second processor is disposed in the electronic apparatus. The second energy storing component is disposed in the electronic apparatus, coupled with the second processor and configured to provide the electrical energy to the processor. The second electrode is disposed on a second surface of the slot and coupled to the energy storing component. The sensor is disposed in the slot and coupled with second processor. When the input apparatus is placed into the slot, the first electrode and the second electrode correspondingly contact with each other.

A method of charging the input apparatus provided by the present invention includes providing a first electrode disposed on the input apparatus, providing a second electrode disposed in an electronic apparatus, then sensing whether the input apparatus is placed in a slot of the electronic apparatus and coupling the first electrode with the second electrode, and providing electrical energy through the second electrode to charge a first energy storing component in the input apparatus through the first electrode.

To sum up, the input apparatus provided by the present invention may be charged by using the electrical energy received by the electronic apparatus through the electrode disposed on the input apparatus when the input apparatus is accommodated in the slot of the electronic apparatus. Accordingly, the input apparatus may complete charging operation without an additional charger, such that the convenience of usage is improved.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
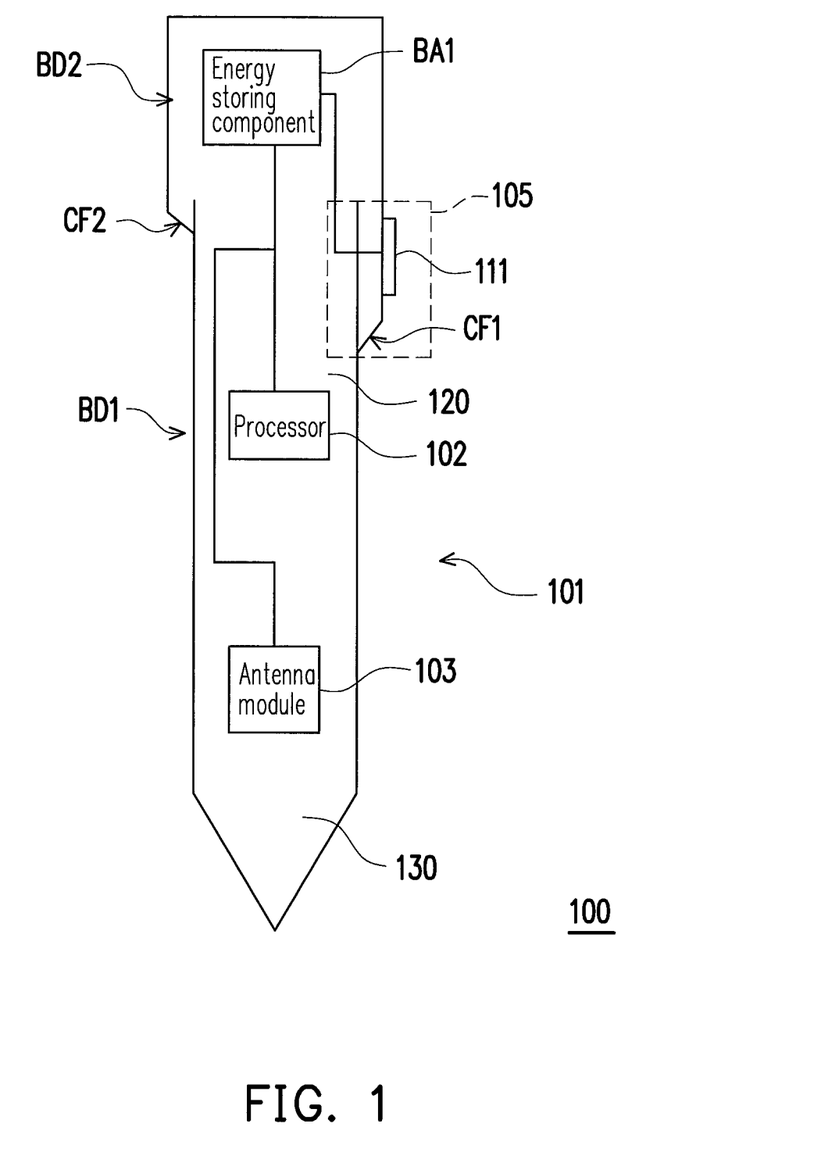
FIG. 1 is a schematic diagram illustrating an input apparatus 100 according to an embodiment of the present invention.

Referring to FIG. 1, FIG. 1 is a schematic diagram illustrating an input apparatus 100 according to an embodiment of the present invention. The input apparatus 100 may be, for example, a stylus pen. The input apparatus 100 includes a main body 101, an energy storing component BA1, a processor 102, an antenna module 103 and an electrode 111. The energy storing component BA1, the processor 102 and the antenna module 103 are disposed in the main body 101. The main body 101 may have a slot to contain the energy storing component BA1, the processor 102 and the antenna module 103. The antenna module 103 is coupled with the processor 102, and the energy storing component BA1 is coupled to the antenna module 103 and the processor 102. The energy storing component BA1 provides electrical energy to the antenna module 103 and the processor 102. The electrode 111 is disposed on a surface of the main body 101 and coupled to the energy storing component BA1 through, for example, a metal wire. In the present embodiment, the electrode 111 may include positive and negative electrodes and be configured to generate a circuit loop to receive the electrical energy and charge the energy storing component BA1.

In the present embodiment, the main body 101 includes a stylus body 120 and a stylus head 130. The stylus body 120 and the stylus head 130 are coupled with each other to form the main body 101. The stylus head 130 may have a tapered diameter. In the present embodiment, a diameter of the stylus body 120 and a diameter of the stylus head 130 on contacting surfaces therebetween may be the same, but may also be different from each other. The stylus body 120 may be composed of main body portions BD1 and BD2. The main body portion BD1 contacts the stylus head 130. The main body portion BD2 is connected to the main body portion BD1 and physically isolated from the stylus head 130. Additionally, a positioning portion 105 is disposed on a surface of the main body portion BD1. The positioning portion 105 may contact the main body portion BD2. Meanwhile, the electrode 111 is disposed on a surface of the positioning portion 105, and the positioning portion 105 contacts the main body portion BD1 via an inclined surface CF1. The main body portion BD2 contacts the main body portion BD1 via an inclined surface CF2. Moreover, a diameter of the main body portion BD2 may be greater than that of the main body portion BD1.

The antenna module 103 is coupled with the processor 102, and the processor 102 receives information in a wireless manner through the antenna module 103.

It should be noticed that when the input apparatus 100 is inserted into, for example, a handheld electronic apparatus (not shown), the input apparatus 100 may be electrically connected with the handheld electronic apparatus through the electrode 111 and receive the electrical energy transmitted from the handheld electronic apparatus so as to charge the energy storing component BA1 through the electrode 111. Herein, the energy storing component BA1 may be a chargeable button battery, a pin battery or an ultracapacitor.

It is apparent from the above description that the input apparatus 100 may complete charging the energy storing component BA1 merely contacting the handheld electronic apparatus belonging thereto. As such, a user may charge the input apparatus 100 any time without bringing a charger with him/her, such that the convenience of the handheld electronic apparatus may be effectively improved.

Figure 2:
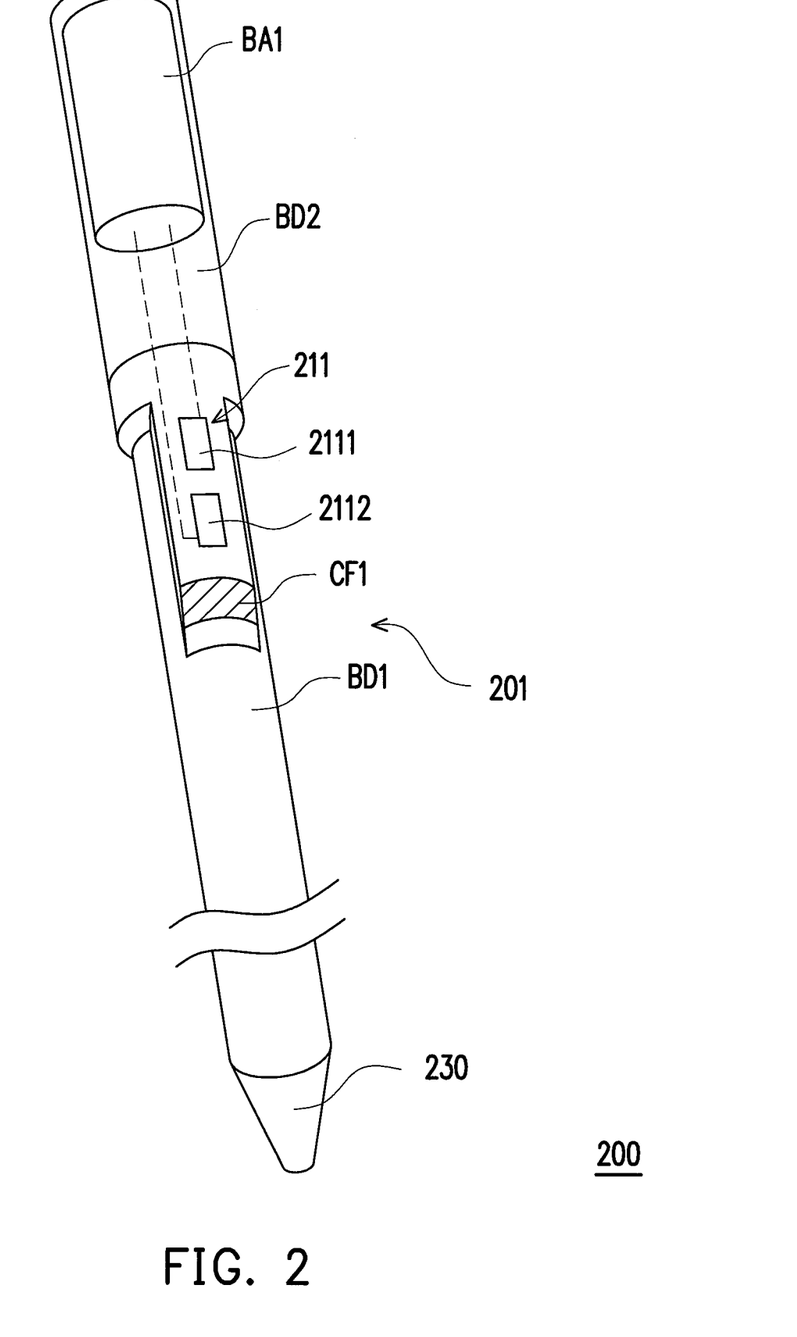
FIG. 2 is a schematic diagram illustrating an input apparatus 200 according to another embodiment of the present invention.

Referring to FIG. 2, FIG. 2 is a schematic diagram illustrating an input apparatus 200 according to another embodiment of the present invention. The input apparatus 200 includes a main body 201, an energy storing component BA1 and an electrode composed of a metal gaskets 2111 and 2112. The main body 201 is formed by serially connecting main body portions BD2 and BD1 and a stylus head 230. A stylus body of the input apparatus 200 is formed by the main body portions BD2 and BD1. A positioning portion 211 is further disposed on a surface of the main body portion BD1. The positioning portion 211 contacts the main body portion BD2. The electrode composed on the metal gaskets 2111 and 2112 is disposed on a surface of the positioning portion 211. It should be noticed that the positioning portion 211 contacts the main body portion BD1 via an inclined surface CF1.

The metal gaskets 2111 and 2112 may be electrically connected with the energy storing component BA1 through, for example, a metal wire. Here, the relationship between relative positions of the metal gaskets 2111 and 2112 disposed on the positioning portion 211 is not limited, and the relationship between the relative positions of the metal gasket 2111 and 2112 illustrated in FIG. 2 is merely an example, and constructs no limitations to the present invention.

Figure 3A:
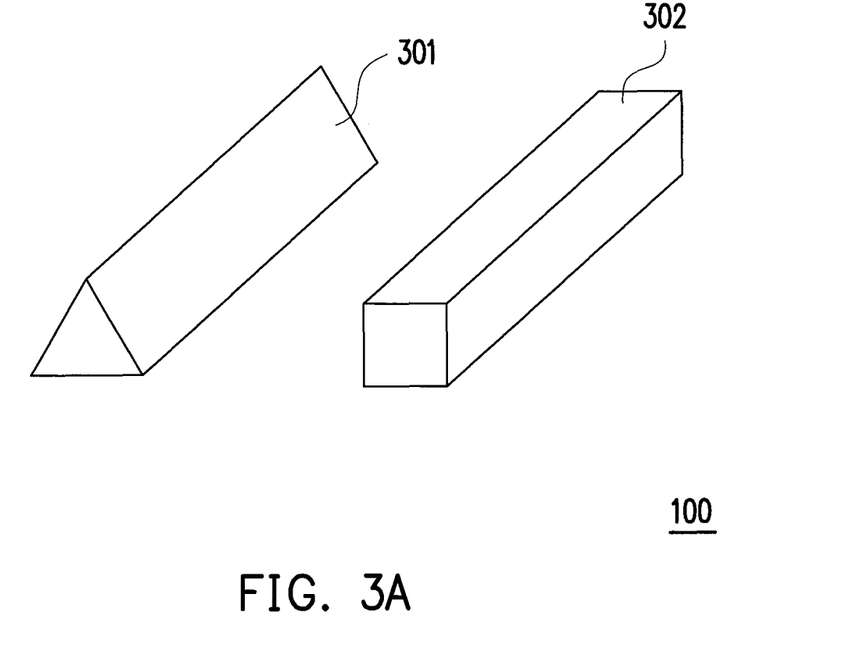
FIG. 3A is a schematic diagram illustrating an implementation of a stylus body according to an embodiment of the present invention.

Referring to FIG. 3A, FIG. 3A is a schematic diagram illustrating the implementation of the stylus body according to an embodiment of the present invention. The stylus body of the input apparatus according to embodiments of the present invention may be not only arc-shaped as shown in FIG. 2 but also triangular as a stylus body 301 or rectangular as a stylus body 302 as shown in FIG. 3.

Figure 3B:
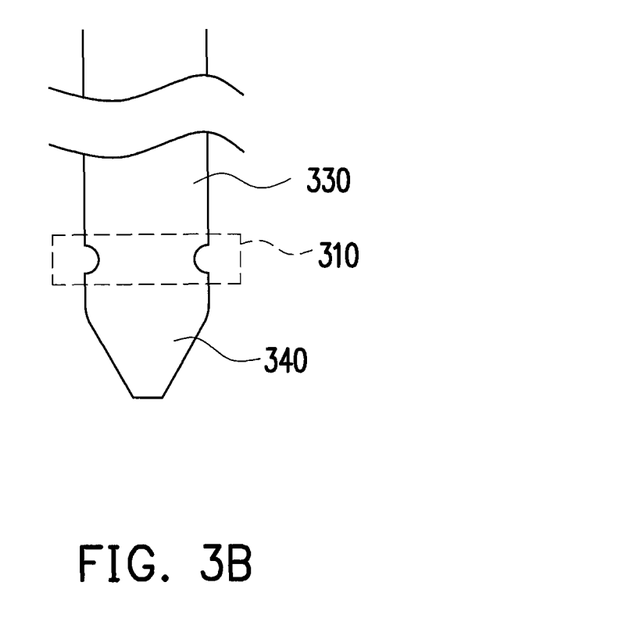
FIG. 3B is a schematic diagram illustrating an implementation of a locking concave portion according to an embodiment of the present invention.

Referring to FIG. 3B, FIG. 3B is a schematic diagram illustrating an implementation of a locking concave portion according to an embodiment of the present invention. A locking concave portion 310 may be formed on a connection place of a stylus head 340 and a stylus body 330. When an input apparatus is placed into, for example, an electronic apparatus of a handheld electronic apparatus, the locking concave portion 310 may be configured to lock the input apparatus with the handheld electronic apparatus so that the input apparatus may be stably fixed in the handheld electronic apparatus.

Figure 4A:
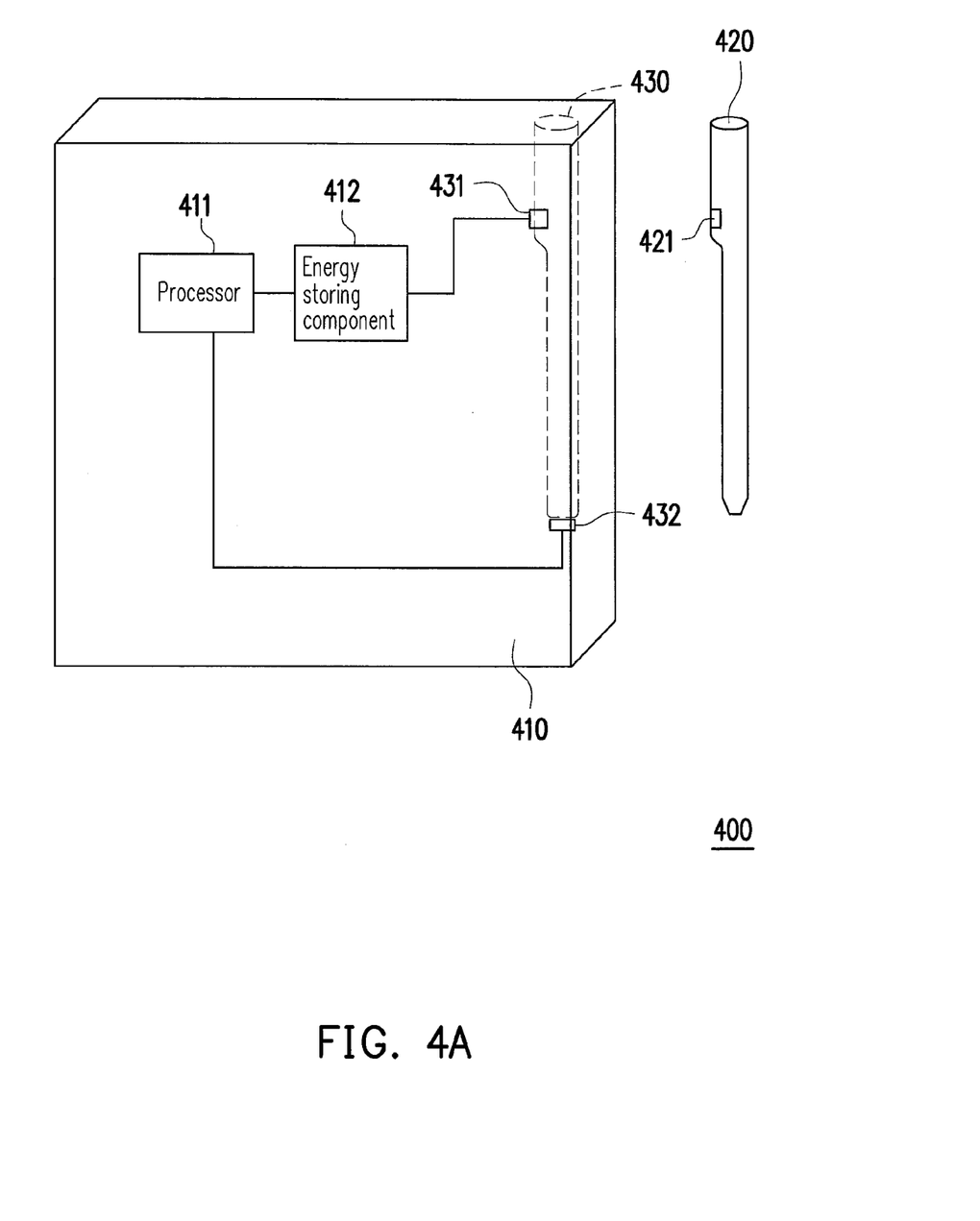
FIG. 4A and FIG. 4B are schematic diagrams respectively illustrating an electrical system 400 according to still another embodiment of the present invention.
Figure 4B:
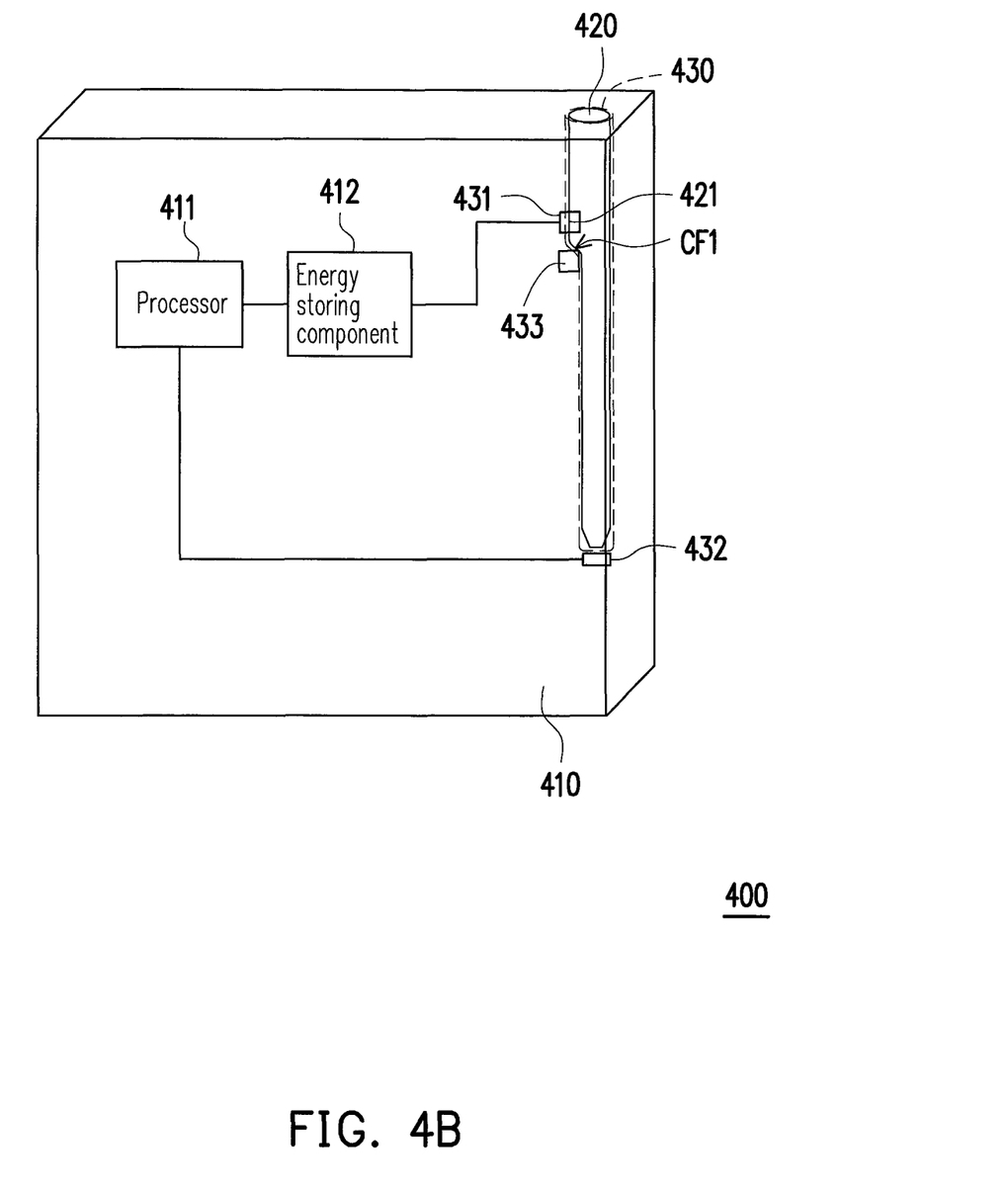

Referring to FIG. 4A and FIG. 4B, FIG. 4A and FIG. 4B are schematic diagrams respectively illustrating an electronic system 400 according to still another embodiment of the present invention. In FIG. 4A, the electronic system 400 includes an electronic apparatus 410 and an input apparatus 420. The electronic apparatus 410 includes a processor 411, an energy storing component 412, a containing slot 430, an electrode 431 and a sensor 432. The processor 411 is coupled to the energy storing component 412 and the sensor 432. The electrode 431 is disposed on a surface of the containing slot 430. The electrode 431 is exposed to the air. The sensor 432 is disposed in the containing slot 430, and in the present embodiment, the sensor 432 is disposed on the bottom of the containing slot 430. The electrode 431 may be constituted of an elastic member.

It is clearer with reference to FIG. 4B that when the input apparatus 420 is placed into the slot 430, the input apparatus 420 contacts the sensor 432 and informs the electronic apparatus 410 that the input apparatus 420 is effectively placed into the slot 430. In the meantime, the electrode 421 on the input apparatus 420 and the electrode 431 on a surface of the slot 430 are electrically connected, and the input apparatus 420 is stably fixed by the elasticity provided by the electrode 431 constituted of the elastic member. In such state, the electronic apparatus 410 may detect a power state of the energy storing component in the input apparatus 420 through the electrodes 421 and 431. When the electronic apparatus 410 detects that the power state of the energy storing component in the input apparatus 420 is lower than a predetermined value, the electronic apparatus 410 may provide electrical energy through the electrode 431 and charge the energy storing component in the input apparatus 420 through the electrode 421. Moreover, the electronic apparatus 410 may also display the power state of the energy storing component in the input apparatus 420 on a display screen (not shown) to inform the user about the power state of the energy storing component in the input apparatus 420.

Additionally, when the energy storing component of the input apparatus 420 is charged to a sufficient electrical energy level, the electronic apparatus 410 may stop charging the energy storing component of the input apparatus 420 so as to prevent the energy storing component of the input apparatus 420 from being damaged due to overcharge.

The electronic apparatus 410 further detects whether there is any abnormal state occurring on the electrode 431. When a short-circuit occurs in electrode 431, the electronic apparatus 410 may display the abnormal state on the display screen to remind the user that the abnormity already occurs in the handheld electronic apparatus 400. In brief, the electronic apparatus 410 may detect whether overcurrent and/or overvoltage occurs in a circuit loop formed on the electrode 431 so as to start a corresponding protection mechanism and display the abnormal state.

Meanwhile, the sensor does not have to be disposed on the bottom of the slot 430. In FIG. 4B, the sensor 432 may be disposed on a position capable of generating a stress when the input apparatus 420 is placed into the slot 430, such as a position capable of sensing a stress provided by the inclined surface CF1 of an extension portion of the input apparatus 420. Both the sensors 432 and 433 may be buttons, and when the sensors 432 and/or 433 are pressed, it represents that the input apparatus 420 is placed into the slot 430.

Figure 5:
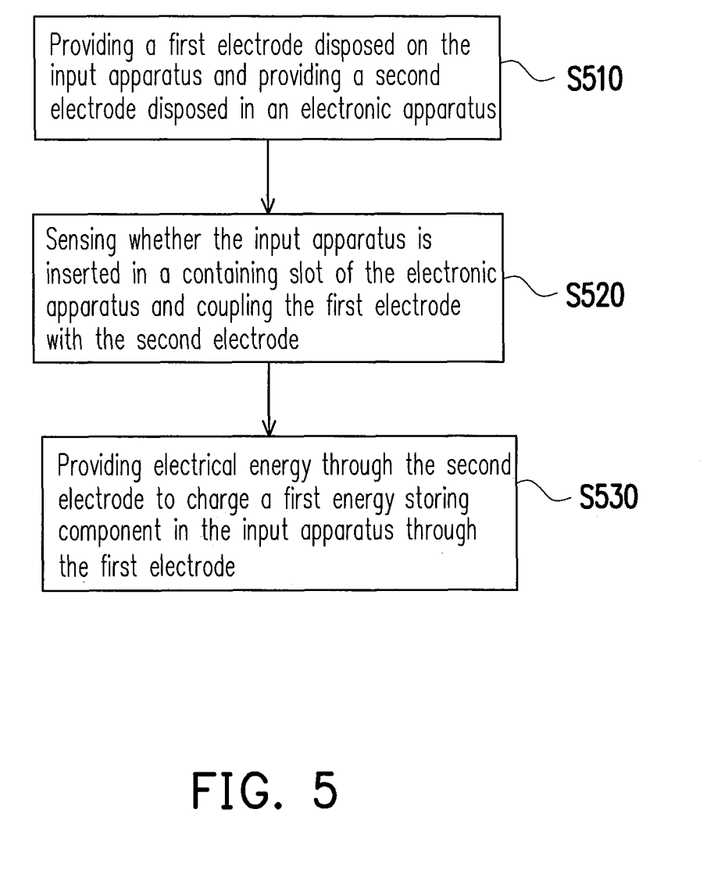
FIG. 5 is a flowchart illustrating a method of charging an input apparatus method according to an embodiment of the present invention.

Referring to FIG. 5, FIG. 5 is a flowchart illustrating a method of charging an input apparatus method according to an embodiment of the present invention. In step S510, a first electrode disposed on an input apparatus is provided, and a second electrode is disposed in an electronic apparatus. And, in step S520, whether the input apparatus is placed in to a slot of the electronic apparatus is sensed, and the first electrode and the second electrode are coupled with each other. Finally, in step S530, a first energy storing component in the input apparatus is charged by the second electrode providing electrical energy through the first electrode.

Details of each of the steps have described in the above embodiments and implementations and will not be repeated hereinafter.

Based on the above, the input apparatus provided by the present invention may be contained in the electronic apparatus belonging thereto. The energy storing component in the input apparatus is charged by the electrical energy provided from the electronic apparatus. As such, the user does not have to bring the charger of the input apparatus with him/her, but can control the electronic apparatus by using the input apparatus only if the electronic apparatus still has the sufficient electrical energy. As a result, the convenience of the electronic apparatus may be effectively improved.

What is claimed is:

1. An input apparatus, comprising:
   a main body, comprising a stylus body and a stylus head;
   a processor, disposed in the main body;
   an antenna module, disposed in the main body and coupled with the processor;
   an energy storing component, disposed in the main body, coupled to the processor and the antenna module and configured to provide electrical energy to the processor and the antenna module; and
   an electrode, disposed on a surface of the main body and coupled to the energy storing component,
   wherein when the input apparatus is in an electronic apparatus, the electronic apparatus contacts the electrode and charges the energy storing component through the electrode, and
   wherein the stylus body comprises a first main body portion extending along a first direction and connected to the stylus head and a positioning portion disposed thereon, the positioning portion protrudes outwardly from the first main body portion along a second direction not parallel to the first direction, and the electrode is disposed on a surface of the positioning portion.

2. The input apparatus according to claim 1, wherein the stylus body includes a second main body portion contacting the first main body portion, and a caliber of the second main body portion is greater than that of the first main body portion.

3. The input apparatus according to claim 2, wherein the first main body portion contacts the second main body portion via an inclined surface.

4. The input apparatus according to claim 2, wherein the positioning portion extends to the second main body portion and contacts the same.

5. The input apparatus according to claim 4, wherein the positioning portion contacts the first main body portion via an inclined surface.

6. The input apparatus according to claim 1, wherein the stylus body is a triangular or a rectangular structure.

7. The input apparatus according to claim 1, wherein the energy storing component is a capacity battery.

8. The input apparatus according to claim 1, wherein a locking concave portion is disposed on a connection place of the first main body portion and the stylus head.

9. An electrical system, comprising:
   an input apparatus, comprising:
      a main body, comprising a stylus body and a stylus head;
      a first processor, disposed in the main body;
      an antenna module, disposed in the main body and coupled with the first processor;
      a first energy storing component, disposed in the main body, coupled to the first processor and the antenna module and configured to provide electrical energy to the first processor and the antenna module; and
      a first electrode, disposed on a first surface of the main body and coupled to the first energy storing component; and
   an electronic apparatus, having a containing slot to contain the input apparatus, the electronic apparatus comprising:
      a second processor, disposed in the electronic apparatus;
      a second energy storing component, disposed in the electronic apparatus, coupled to the second processor and configured to provide electrical energy to the first processor;
      a second electrode, disposed on a second surface in the containing slot and coupled to the first energy storing component; and
      a sensor, disposed in the containing slot and coupled to the second processor,
   wherein when the input apparatus is inserted in the containing slot, the first electrode and the second electrode correspondingly contact with each other, and
   wherein the stylus body includes a first main body portion extending along a first direction and connected to the stylus head and a positioning portion disposed thereon, and the positioning portion protrudes outwardly from the first main body portion along a second direction not parallel to the first direction, and the first electrode is disposed on a surface of the positioning portion.

10. The electrical system according to claim 9, wherein the second electrode is an elastic member configured to allow the first electrode and the second electrode lean against to each other when the input apparatus is placed in the containing slot.

11. The electrical system according to claim 9, wherein the containing slot comprises a trench, the second electrode is disposed on a surface of the containing slot, and the positioning portion is contained in the trench when the input apparatus is placed in the containing slot.

12. The electrical system according to claim 9, wherein the stylus body comprises a second main body portion contacting the first main body portion, and a caliber of the second main body portion is greater than that of the first main body portion.

13. The electrical system according to claim 9, wherein the stylus body is a triangular or a rectangular structure.

14. The electrical system according to claim 9, wherein the positioning portion contacts the first main body portion via an inclined surface.

15. The electrical system according to claim 9, wherein the sensor generates a detection signal when contacting the input apparatus.

16. The electrical system according to claim 15, wherein the electronic apparatus transmits the electrical energy from the second energy storing component to the first energy storing component through the second electrode according to the detection signal.

17. A method of charging an input apparatus, comprising:
    providing a first electrode disposed on the input apparatus, wherein the input apparatus extends along a first direction;
    providing a second electrode disposed in an electronic apparatus, wherein the first and second electrodes are disposed on a surface of a positioning portion, and the positioning portion is disposed on the input apparatus and protrudes outwardly from the input apparatus along a second direction not parallel to the first direction;
    sensing whether the input apparatus is inserted in a containing slot of the electronic apparatus and coupling the first electrode with the second electrode; and
    providing electrical energy through the second electrode to charge a first energy storing component in the input apparatus through the first electrode.

18. The method according to claim 17, wherein the step of sensing whether the input apparatus is inserted in the containing slot of the electronic apparatus further comprises:
    generating a detection signal by sensing whether the input apparatus is inserted into the containing slot of the electronic apparatus.

19. The method according to claim 17, wherein the step of providing electrical energy through the second electrode to charge the first energy storing component in the input apparatus through the first electrode comprises:
    providing the electrical energy to the second electrode by a second energy storing component of the electronic apparatus; and
    charging the first energy storing component in the input apparatus through the first electrode coupled with the second electrode.

\* \* \* \* \*